United States Patent [19]
Ahrens

[11] 3,790,925
[45] Feb. 5, 1974

[54] ECHO-SOUNDING APPARATUS HAVING A DIGITAL INTERMEDIATE STORE

[75] Inventor: Erhard Ahrens, Kiel, Germany

[73] Assignee: Electroacustie GmbH, Kiel, Germany

[22] Filed: June 19, 1970

[21] Appl. No.: 47,770

[30] Foreign Application Priority Data
June 26, 1969 Germany............... P 19 32 346.7

[52] U.S. Cl................. 340/3 R, 340/3 C, 343/5 DP
[51] Int. Cl.............................................. G01s 9/68
[58] Field of Search ... 340/1 C, 3 C, 3 R, 6 M, 1 R; 343/100 CL, 5 DP

[56] References Cited
UNITED STATES PATENTS

| | | | |
|---|---|---|---|
| 3,218,637 | 11/1965 | Balding | 343/5 DP |
| 3,363,226 | 1/1968 | Murphree | 343/5 DP |
| 3,569,966 | 3/1971 | Dunn et al. | 343/5 DP |
| 3,435,407 | 3/1969 | Bertheas | 340/3 |

Primary Examiner—Richard A. Farley
Attorney, Agent, or Firm—Curt M. Avery; Arthur E. Wilfond; Herbert L. Lerner

[57] ABSTRACT

This invention relates to echo-sounding apparatus of the kind employing at least one digital intermediate store and an indicating apparatus, and in which echo signals that arise within a sounding period and which form echo information, are read into the intermediate store and are subsequently interrogated or read out of this store and then fed to the indicating apparatus. In order to remove the defects attendant upon hitherto usual digital intermediate stores, the invention provides at least one timing pulse generator which is associated with the intermediate store and is operable at a selected frequency or, alternatively, at least two timing pulse generators are provided that operate at different pulse frequencies: in either case the intermediate store is operated on read-in of the echo information at a frequency which is different from the read-out frequency. As a result, it is possible to adjust the read-out speed independently of the read-in speed. In this way, either the whole of the echo information can be read-out slower or quicker than the speed of read-in or, alternatively, a portion of the echo information can be read-out slower or quicker than the remaining part of the echo information.

6 Claims, 16 Drawing Figures

ECHO-SOUNDING APPARATUS HAVING A DIGITAL INTERMEDIATE STORE

BACKGROUND OF THE INVENTION

The present invention relates to an echo-sounding apparatus with at least one digital intermediate store and an indicating apparatus, echo signals appearing within one sounding period, which form the echo information, being read into the intermediate store and being subsequently interrogated or read out of the store, and fed to the indicating apparatus.

Echo-sounding apparatus is known which utilises magnetic drums instead of digital intermediate stores. With these drums, a portion of the echo information is stored during one sounding period and read out during the next sounding periods several times per second, for example, ten times per second. In this way, a steady indication is given on the indicating apparatus during relatively long sounding periods.

In order that a magnetic drum store shall operate correctly, a very small spacing must be maintained between the magnetic heads and the drum. Stores of this kind must, therefore, be made with extremely high precision. Consequently, problems concerning finishing, wear and adjustment, arise. Furthermore, the speed of the drive motors for the drums must be maintained to a high degree of constancy by regulating circuits.

It is an object of the invention to provide echo-sounding apparatus using digital intermediate stores instead of magnetic drums, but without the disadvantages previously attendant on such use.

Independently of this, with drum stores, the read-out, or playback, speed of the echo information must be the same as the read-in, or recording, speed since, in practice, the speed of the drums cannot be suddenly altered. There are, however, a number of fields of use in echo-sounding apparatus, in which it is desirable to be able to effect read-out from the intermediate store at a different speed from that at which read-in was effected.

Therefore, it is a further object of the invention to provide an intermediate store, wherein the read-in and read-out of the echo information can take place at different speeds, and in special cases, wherein the speed during read-in and/or during read-out can be altered one or more times.

SUMMARY OF THE INVENTION

This and other objects of the invention are achieved in an echo-sounding apparatus having at least one digital intermediate store and an indicating apparatus, echo signals appearing within one echo-sounding period, which form the echo information, being read into the intermediate store and subsequently interrogated or read-out of the store and fed to the indicating apparatus, by associating with the intermediate store at least one timing pulse generator operable at a selected frequency, or alternatively, at least two timing pulse generators operating at different pulse frequencies, and by operating the intermediate store on storage, i.e., read-in, of the echo information at a pulse frequency different from the read-out pulse frequency.

Due to the possibility of change-over between several pulse frequencies, the echo information read-out speed can be adjusted independently of the read-in speed. Thus, the whole of the echo information can be read-out slower or quicker than the speed of read-in thereof, or a portion of the echo information can be read-out slower or quicker than the remainder of the echo information. This will be explained hereinafter with reference to certain examples for different operating methods.

In order to simplify the wording, reference will mostly be made to several timing pulse generators, each of which works at a particular pulse frequency. It will be clear, however, that the scope of the appended claims also includes the case where only a single generator is switchable to different pulse frequencies.

A. Operating Methods

Operating Method I-Preferably For Large Sounding Distances:

Sounders used for purposes of investigation must be able to sound the greatest attainable depths, i.e., depths about 10 km. Also in horizontal sounding, as for example as used in fishing, the range requirements become very extensive. Now, if the echo information as it appears, i.e., in real time, is displayed on the screen of a cathode ray tube, it is not possible for an observer, even using a tube with a long persistance screen, to compare or keep in his mind, the individually indicated echo pulses of a sounding period or the echo pulses of sequential soundings if, for example, 20 seconds or more have elapsed in the meantime.

In carrying out the invention, a stable picture is produced by storing the echo pulses of a sounding period in real time and reading them out periodically in the succeeding sounding period at a higher pulse frequency in such a manner that there is a stable picture on the indicating apparatus. In one embodiment of the invention, this is effected by using a higher pulse frequency for read-out of the echo information than for the read-in thereof, the store, as also the known magnetic drum store, being repeatedly read out.

Advantageously, a two-beam cathode ray tube may be utilised as the indicating apparatus, the first beam of which is influencable by echo information occurring in real time and the second beam of which is influencable by the echo information of the preceding sounding period repeatedly read out of the store at an increased pulse frequency, and the speed of deflection of the two beams along the time axis having the same relationship as the read-in and read-out frequencies provided for the store.

The two beams of the tubes are deflected linearly in time along the same linear distance scale. The first beam depicts th echo information appearing in real time in the usual fashion. The second beam, which is deflected at a correspondingly higher speed in quick succession, produces a stable indication of the preceding sounding period. In this way, a direct comparison of the echoes of two successive sounding periods can be obtained.

Operating Method II-Indication of Only One Section From the Total Sounding Period:

The invention may also be used for the case in which it is not desired to have an indication of the total sounding period, but only a section therefrom. By means known, per se, a particular section can be chosen and, in accordance with the invention, the scale of indication of this section can be chosen as desired by utilising a timing pulse generator of suitable pulse frequency.

Operating Method III-Scale Variation of a Partial Range within the Playback Range:

There is often interest in illustrating not only the whole sounding range but also to read out therefrom, however, a particular section to a larger scale, for example, that section in which a shoal of fish is located, so that details can be the better observed.

For a partial range to be expanded, preferably on reading into the store, a timing pulse generator of higher frequency is switched on. On the other hand, if a partial range, which is not of interest, is to be compressed then, during read-in, a timing pulse generator of lower frequency can be switched in. Read-out in these cases is at the same frequency. In contradistinction, read-in can be effected at the same frequency and one part of the sounding period can be read out at a higher timing frequency (compression) or at a lower timing frequency (expansion).

For making the indications, there may be used, for example, a mechanical sounding recorder, or a cathode ray tube whose time base runs at constant speed. One advantage of the invention resides in the fact that practically any desired cathode ray tube can be used, so that the user does not have to depend upon elaborate storage tubes with their special scanning techniques, and their limited size does not have to be reckoned with.

Operating Method IV-Flat or Planar Sounding:

There is often a need, during sounding of very shallow depths, for example, below two metres, as occurs in rivers, to record the sounding information by means of a mechanical recorder (writer), in order to obtain a permanent document. Sounding ranges of this kind can be recorded by means of mechanical recorders with a writing stylus moved over the recording paper but not directly, since the writing stylus, due to the very short sounding periods, must circulate at an enormous speed and the centrifugal and acceleration forces thereby occurring cannot be controlled. In order to solve the problem, there has become known a writing instrument (Japanese firm Koden) which operates with about three hundred stationary writing styli, of which each one records only a punctiform partial range of the whole echo information. This writing instrument is complicated and expensive and, moreover, can only work with wet paper.

This problem can be solved in a more elegant and cheaper fashion by means of an apparatus according to the invention, in which, in accordance with a further feature thereof, a timing pulse generator can be used for read-out which is of lower frequency than that used for read-in. In this way, the writing range can be expanded. The needle of the writing instrument can thus be circulated at an easily controllable speed and the echo information can be expanded on read-out in such a fashion that it can be distributed over the available widths of recording paper.

B. Types of Digital Stores:

In accordance with the invention, digital stores of different kinds can be used. For example, an addressable core store can be used. For certain purposes of use of the invention, care must be taken that the information is repeatedly interrogated or read-out of the core store and is thus not destroyed after the first interrogation or read-out operation.

Advantageously, according to another feature of the invention, at least one shift register can be used as a store (particularly with static intermediate store elements), output is open for read-in and is connected to its input on read-out, the timing pulse generator being connected to the timing input of the shift register. The shift register should permit reduction of the pulse frequency to zero. In dependance upon the method of operation used, the shift register may be used linearly (for example, IV) or as a ring register (for example, I), i.e., in dependance upon whether the store information has to be read out only once or several times.

When operating with two echo information stores, of which, at any one time, one is reading in whilst the other is reading out and, if for this purpose shift registers are used, then according to a further feature of the invention, a synchronous counter can be associated with the shift register stores (particularly one to each), of the same bit number as the shift register store, in such a manner that it is switchable, in common with the stores, from "read-in" to "read-out" and vice versa, the zero position input of the synchronous counter being connectable to one pulse generator and its output to the saw-tooth voltage generator of a cathode ray tube serving as an indicating apparatus, and the input of the pulse generator of each synchronous counter and of the shift register store allocated thereto, are connectable in circuit at any one time with the pulse generator in such a manner that simultaneously with the switching over of the shift register store, a zero position pulse will be given to the associated synchronous counter, and the counting pulse triggers the saw-tooth voltage generator for the time base of the cathode ray tube at the beginning of read-out of the echo information contained in the store.

A binary or decade counter, with or without a call-back arrangement, can be used. Hereinafter, these counters are referred to as "synchronous counters." The counter is adjusted to zero at the beginning of each storing operation. It is so arranged that the counting commences from zero again when the stored information has passed once through the closed ring-form echo information core. The zero position of the counter releases a trigger pulse on read-out which synchronizes the saw-toth generator with the time base of the cathode ray tube.

By the use of two synchronous counters, the result can be obtained that, at the beginning of each sounding, the read-in echo information store can be exchanged for the read-out echo information store. At this point in time, at the output of the shift register, which is now switched over to read-out there is normally not just the beginning of the echo information but a certain point within the information, i.e., of the sounding range. By means of the switched-over synchronous counters, it is ensured that the switched-in indicating apparatus begins to write at a corresponding position within its indicating range, so that the next following commencement of the total echo information arrives at the start of the picture, for example, at the upper edge of the screen of a cathode ray tube.

In the case where only a portion of the total sounding period is to be read-out, operation can be effected also with a single synchronous counter, if it is so set up or accepted in such a fashion that, on each switching operation of the echo information store from read-in to read-out, the information pulses just arriving at the end of one echo information store, can be used for the beginning of the indication. This can be attained if the echo information store can be allowed to overflow, so to speak, and if there is interest after each switching-over operation only in the whole store content then extant which corresponds, for example, to a sounding range of 15m before the reversal process.

The timing pulse generators necessary for operating the digital stores can also be utilised for displaying scale pulses on the screen of a cathode ray tube at the same time as the picture indications which can then be read off as sounding distance scales, one scale pulse appearing by frequency division after a certain number of timing pulses.

C. Amplitude Quantizing:

When indications are made by means of a mechanical sounding writer or a cathode ray tube, data relative to the current echo strengths are desired. In contradistinction to a magnetic drum store, a digital store delivers this information but not without further ado. According to a further feature of the invention, amplitude quantizing can be attained with the use of digital stores, by providing each store with at least two shift registers parallel each to the other and traversable in the same total time, for indicating the echo strengths, by connecting a coding device before the shift register, which, in dependence upon the echo strengths, feeds echo information pulses to no, to one, or simultaneously to several shift registers, and by connecting a common decoding device to follow the shift register of each store, which gives amplitude-quantized output pulses to the indicating apparatus in dependence upon how many and from which shift registers it receives input pulses.

If operation is carried out with only one single echo information store, then at least two shift registers will be required for the amplitude quantizing. If the operation is carried out with two echo information stores which can be switched alternately between read-in and read-out, then at least two shift registers will be required twice over.

With two shift registers for each store there will be obtained a fourfold amplitude quantizing, viz. for example, amplitudes of the sizes 0, 1, 2, 3. With three shift registers for each store, then $2^3 = 8$ different amplitudes can be indicated.

One piece of amplitude information can be stored also in one single shift register if pulse length modulation is used. This requires a higher bit number of the shift register, but for this no decoding device is necessary on read-out by means of a writing instrument.

For an understanding of the principles of the invention, reference is made to the following description of typical embodiments thereof, as illustrated in the accompanying drawings.

Referring now to the drawings, the embodiment according to FIGS. 1a to 8 will first be described which is suitable for carrying out operating methods I and II.

Figure 1A:
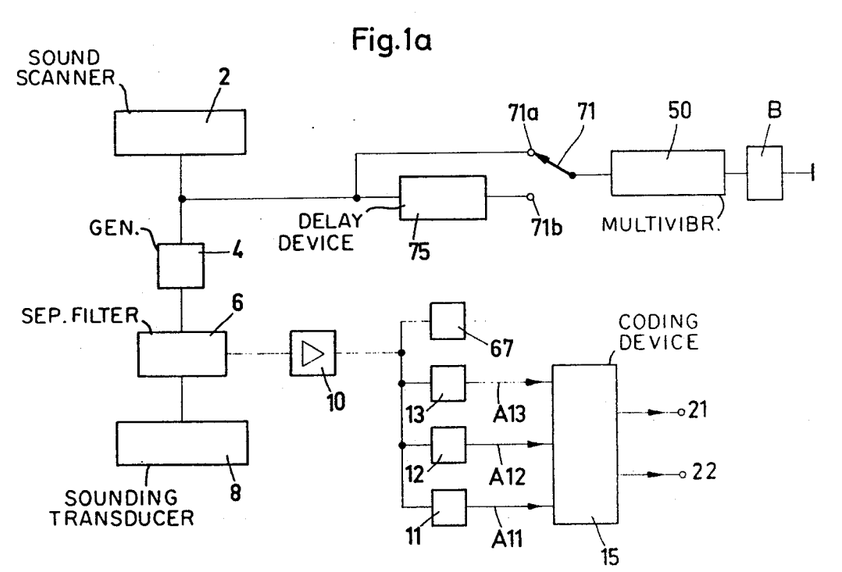
FIGS. 1a and 1b show in common the circuitry of an echo-sounding apparatus for the operating methods I and II, with shift registers as digital stores with an arrangement for amplitude quantizing the indication.

FIG. 1a shows to the left a transceiver apparatus for the echo pulses. A sounding scanning apparatus 2 produces pulses spaced for the chosen echo periods and by which a generator 4 is triggered. The generator produces an alternating voltage pulse at ultrasonic frequency and of lengths corresponding to a few oscillations. The pulse is fed to a sounding transducer 8 via a switch or separating filter 6. From this a corresponding ultrasonic pulse is given off into the water. The sounding transducer serves, after transmitting the pulse, as a receiver for the ultrasonic echo pulses and produces corresponding alternating voltages which are fed to an amplifier 10 via the device 6. So far the arrangement is known.

Figure 5:
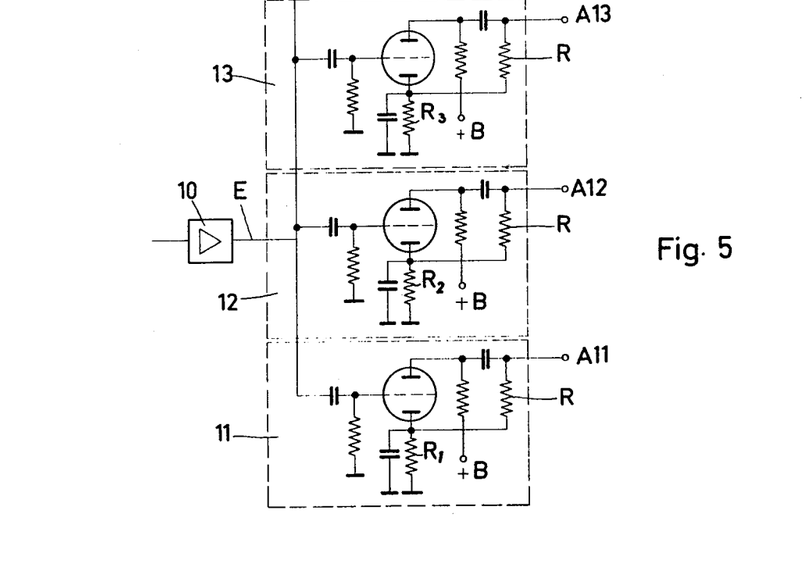
FIG. 5 shows a circuit diagram of amplitude filters.

Three amplitude filters 11–13 are connected to the amplifier 10 and are connected in parallel, each to the other. In FIG. 5, the amplitude filters are illustrated as electron tubes, as an example. Naturally, the amplitude filters may comprise other circuit elements, for example, transistors. The three amplitude filters include the same components except insofar as their cathode resistors R1–R3 are concerned. The different grid — cathode voltages are taken care of by means of the differing cathode resistors in conjunction with a voltage distribution resistor R. The triode of the amplitude filter 11 has the smallest grid bias and passes all signals to its output which exceed a relatively small threshold value. The amplitude filter 12 only passes signals whose amplitude is greater than a somewhat higher threshold value, and so on.

The output signals of the amplitude filters 11—13 give the following pointers:

If no signal appears at the outputs A11–A13 of the amplitude filters, then the amplitude of the input signal (at E, FIG. 5) is smaller than a value $a$. If an output signal appears only at A11, then the amplitude is greater than $a$ and smaller than $b$. If a signal appears at each of the outputs A11 and A12, then the amplitude lies between $b$ and $c$. If a signal appears at all three outputs A11–A13, then the amplitude is greater than $c$, in which:

$$a < b < c \text{ for example } a:b:c = 1:2:3$$

Figure 6:
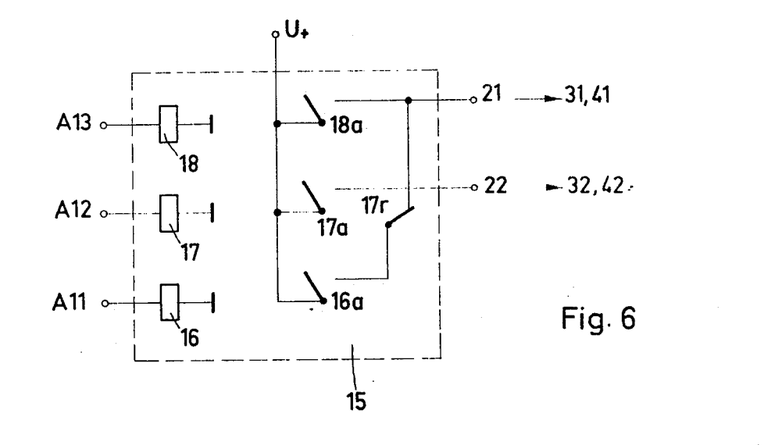
FIG. 6 shows a circuit diagram of a coding device which is connected in advance of the two shift registers of one or the other store.

A coding device is connected to the outputs A1-1–A13 of the amplitude filters and can be constructed as shown in FIG. 6 and has the function of injecting pulses into two shift registers 31, 32 or 41, 42 of a store, for the attainment of an amplitude-quantized indication. A relay coil 16, 17 or 18 is connected to each of the outputs A11–A13, the other ends of said coils being connected to earth. (If alternating current pulses appear at the inputs A11–A13 then alternating current relays are used).

Figure 1B:
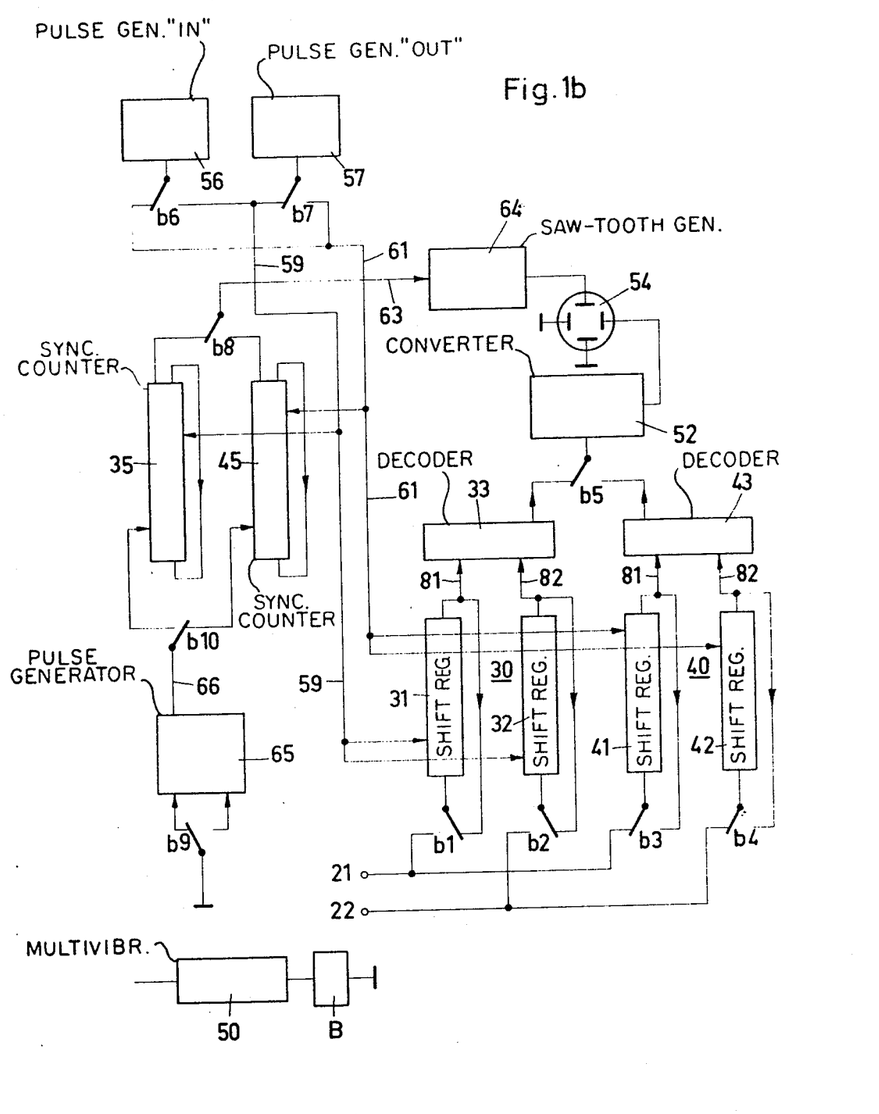
Figure 1C:
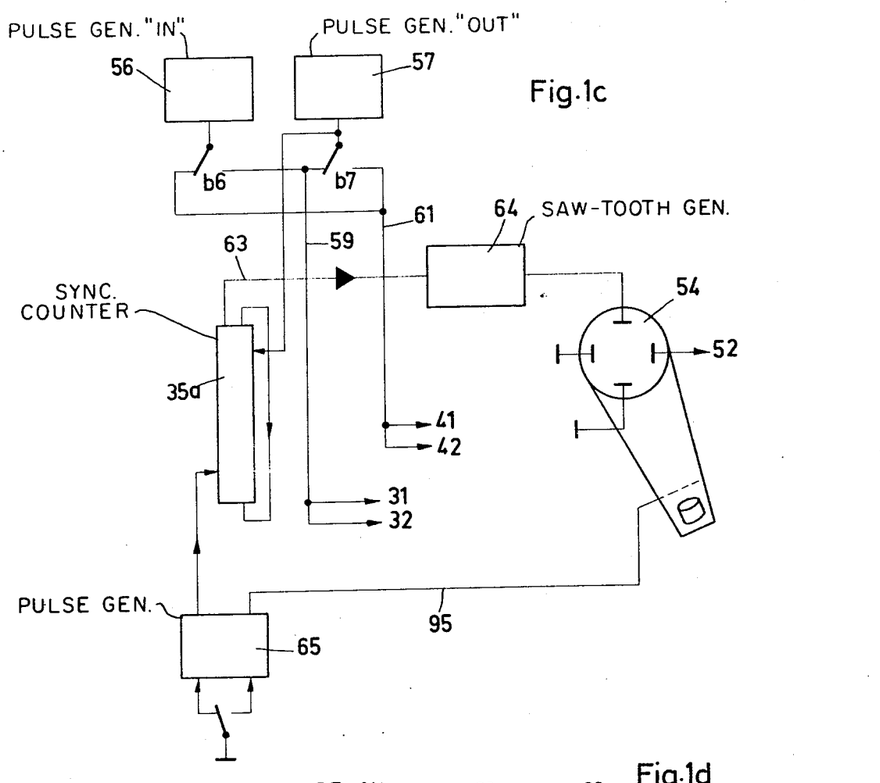
FIGS. 1c and 1d show modifications of the arrangements of FIGS. 1b and 1a, respectively.

In the description, relays are referred to in FIGS. 1b, 1c and this is in order to simplify the illustration. In practice, combinations of multivibrators and gates would be used instead of mechanical relays. In place of contacts, in actuality gates would be opened or closed.

A working contact 16a, 17a and 18a is associated respectively with each of the relay coils 16, 17 and 18 and, moreover, a rest contact 17r is associated with the relay coil 17. By closing or opening the contacts, it is ensured that at any predetermined point in time a pulse is fed from a voltage source U+, to no, to one, or to both of the shift registers 31, 32 or 41, 42 connected to said contacts.

If an input pulse appears only at A11, then the contact 16a is closed and a pulse is conveyed via this contact and the rest contact 17r to an output 21 and from this to one of the shift registers 31/41.

If a pulse appears at each of the inputs A11—A12, then the contact 16a is again closed but the rest contact 17r is opened by the relay coil 17, so that the pulse appearing at A11 is rendered ineffective. By closing the contact 17a, a pulse is conveyed only to the output 22 and from this to the other shift register 32/42.

If a pulse appears at each of the inputs A11–A13, then a pulse is conveyed via contact 18a to the output 22 and a further pulse is conveyed to the output 22 via the contact 17a. The connected shift registers therefore receive the information O or L in accordance with the following Table 1:

TABLE 1

| Amplitude x | Information in the Shift Register | |
|---|---|---|
| | 31/41 | 32/42 |
| $0 < x < a$ | O | O |
| $a < x < b$ | L | O |
| $b < x < c$ | O | L |
| $c < x$ | L | L |

FIG. 1b shows two echo information stores which are indicated generally at 30 and 40. Each of these stores contains two shift registers 31, 32 or 41, 42. The shift registers are connected to the outputs 21, 22 of the coding device according to FIG. 6 for recording, as is shown in FIG. 1b for the shift registers 41, 42. For playback, the shift registers are connected as ring registers as is shown in FIG. 1b for the shift registers 31, 32. Contacts b1 to b4 are provided for reversal purposes. All the contacts illustrated in FIG. 1b are operated by means of a common relay coil B which is connected to a bistable multivibrator 50 and, by means of this, either receives current or not. The operation of the multivibrator will be described later.

The shift registers have static intermediate store elements (static shift registers) and can, therefore, store information over longer periods of time. They each have, for example, 50 stages, which is sufficient to store and playback a sounding range with sufficient definition. To each of the outputs of the shift registers of the store 30 and of the store 40 is connected a decoding device 33 or 43, respectively. The decoding device of the store just played back, in this case the decoding device 33, is connected by a contact b5 via a DC/AC converter 52 to a cathode ray tube 54. For example, the cathode ray beam is moved downwardly from above in the centre of the screen, linearly with time during deep soundings. An alternating voltage of a corresponding amplitude is produced by the converter 52 in dependence upon the amplitude of the output pulses supplied from the decoding device 33 and 43, which alternating voltage laterally deflects the cathode ray. The display of echo information on a cathode ray tube is described in our Echo Sounding Manual particularly at pages 26–29 of the German edition and pages 43– 47 of the English Edition.

Figure 2:
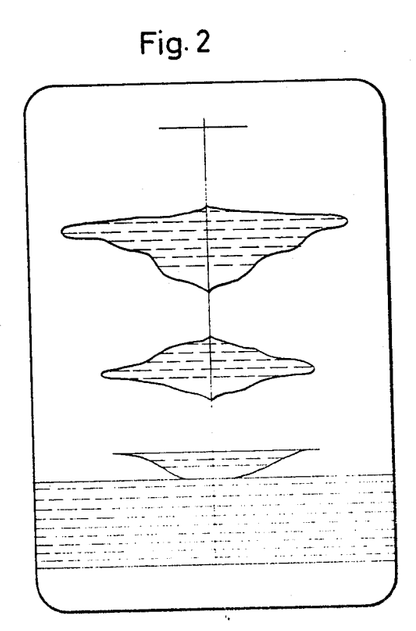
FIGS. 2 and 3 show the indication of echo information on the screen of a cathode raytube, the amplitudes and the duration of the echoes being shown continuously in FIG. 2 and in quantized form in FIG. 3, FIG. 4 schematically shows pulses which are fed into two shift registers of a store and include in common the picture information illustrated in FIG. 3.

FIG. 2 shows one of the hitherto usual echo indications on the screen of a cathode ray tube, the depth of the echo transmitter being given along the vertical line and the amplitude of the echo signal being given along the horizontal line. This indication is continuous both in time and in amplitude.

Figure 3:
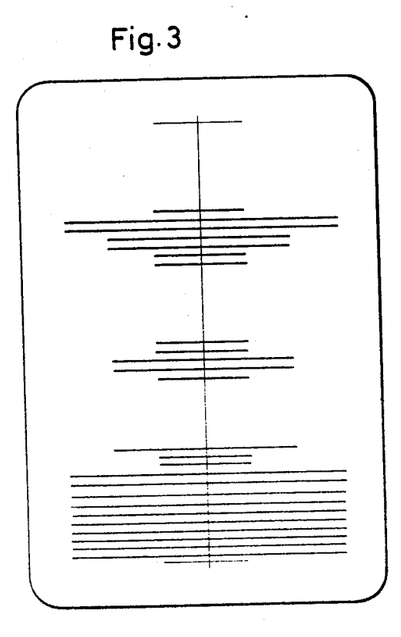
Figure 4:
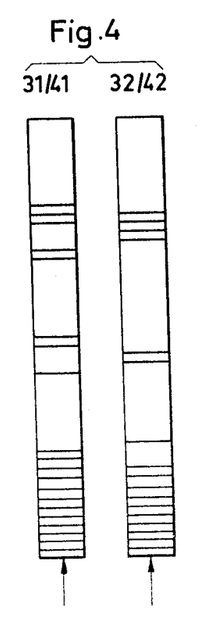

On the other hand, FIG. 3 shows also on the screen of a cathode ray tube an indication which is quantized both as regards time and amplitude. There appear horizontal lines which are separated one from the other, for example, a maximum of 50 with shift registers having 50 stages. In their width, the lines may have four amplitude stages, namely, O, or lengths which are in the ratio 1: 2: 3. This amplitude quantizing can be obtained by the utilisation of two shift registers for each store as is illustrated in FIG. 4 and will be later described.

If a mechanical sounding writing instrument is used instead of a cathode ray tube, then the echo strengths will be illustrated in known fashion by variation of the strength of the current flowing through the indicating needle, whereby darker or lighter tracks appear on the recording paper.

At least two timing pulse generators 56 and 57 are provided for recording and playback. The generator 57 with the playback frequency is, in the contact position illustrated in FIG. 1b, connected via a contact b7 and a conductor 59 to the timing pulse terminals of the shift registers 31,32. The pulse generator 56 with the recording frequency is connected via a contact b6 and a conductor 61 to the timing pulse terminals of the shift registers 41,42.

If it is desired to be able to switch from one playback frequency to another during playback in one partial range of the indicated sounding section, then a further pulse generator is provided for playback. If the echo sounding apparatus has several recording ranges with different indicating scales, then several sets of the pulse generators illustrated in FIG. 1b are necessary, since for different indicating scales, different recording and playback frequencies are necessary.

For the circuit according to FIG. 1b it will be assumed that the maximum length of a sounding, the number of stages of the shift register and the recording frequency are so related each to the other, that the shift register can just record the echo information of one sounding period. The multivibrator 50 is switched over at the same time as transmission of the transmitted pulses. At the same time all the contacts in FIG. 1b are switched over by means of the relay coil B. On switching over the playback, the outputs of the shift registers 41 and 42 are connected to their inputs. After switching over, a shorter or a longer time can pass until the commencement of the information appears at the output of the shift register and can be utilised for deflecting the cathode ray beam. Care must be taken, however, that the time base of the cathode ray beam of the tube 54 is not only effected synchronously with the storing of the information but also in the correct phase relation so that the picture appears at the corect height on the picture screen and not perhaps the upper part of the picture at the lower end of the screen and vice versa.

In order to obtain this result, two synchronous counters 35 and 45 are provided, whose bit numbers correspond with those of the shift registers. These synchronous counters should be able to supply a synchronizing pulse which is passed to the indicating apparatus when the counters pass through their positions 0 or 1. The position of the synchronizing pulse in the synchronous counter corresponds to the commencement of the echo information which was stored in one of the shift registers 31, 32, 41, 42.

The input for reading the timing pulse into the shift register (FIG. 1b) is connected, via the conductors 59 and 61 and one of the contacts b6 and b7, to one of the pulse generators 56 and 57 and, indeed, the counter 35 is connected at that time to the same pulse generator as the shift registers 31 and 32, and the counter 45 to the same pulse generator as the shift registers 41 and 42.

In the contact position shown in FIG. 1b, the synchronous counter 35 is connected to the cathode ray tube 54 by means of a contact b8 and a conductor 63. Each time the synchronizing pulse appears at the output of the counter 35, the saw-tooth generator 64 of the tube 54 is triggered via the conductor 63, so that the cathode ray beam commences to run downwardly from above. The cathode ray beam returns upwardly after a complete passage of the picture and remains locked there until the next pulse from the synchronous counter 35 appears, whereupon it is deflected downwardly again.

A pulse generator 65 serves for the zero position of the synchronous counter, said pulse generator receiving a voltage surge at one of its two inputs via a switch b9 upon switching over the relay B. The pulse generator produces a pulse at its output 66 for each voltage surge. This pulse is fed to one of the synchronous counters via a contact b10, viz. 45, in the indicated case, and ensures that the synchronous counter is restored to zero.

Instead of the synchronous counters 35/45, alternatively two shift registers could usefully be employed having the same bit number as that of the shift registers 31, 32, 41, 42, for recording the echo information. These synchronizing shift registers are used for recording a synchronizing pulse in a manner corresponding to that with the synchronous counters 35/45 after a previous erasure by means of the pulse generator 65.

As soon as the relay coil B switches over again, the synchronous counter 45 is connected to the tube 54 via the contact b8 and the conduit 63 whilst simultaneously the shift registers 41 and 42 are also connected to the tube 54 via the decoding device 43, the contact b5 and the converter 52. The synchronizing pulse triggers the tube at that moment at which the commencement of the echo information just appears out of the shift registers 41 and 42. Thus, the cathode ray beam does not commence to run immediately with switching over, but only after the appearance of the next synchronizing pulse which coincides with the beginning of the echo information.

In certain cases, a single synchronizing counter or ring-shaped closed shift register can be utilised. This is illustrated for the synchronous counter 35a in FIG. 1c. The parts missing in FIG. 1c are the same as those in FIG. 1b.

The timing input of the synchronous counter 35a is here permanently connected to the playback timing generator 57. It is only restored to zero as in FIG. 1b on switching over the shift register pairs 31, 32 and 41, 42, which then triggers the saw-tooth voltage generator 64 on repetition of the echo information.

This simplified circuit can only be tolerated if it can be so arranged that operations can be commenced immediately with the indication of the echo information just appearing at the output of the echo information store, after each switching over procedure. This is the case when the number of stages in the shift register and the recording frequency are so mutually related that the shift register can record a predetermined partial range of the water depth to be sounded.

The echo information appearing passes through the shift register just recorded. The multivibrator 50 is switched over to a freely selectable point in time. Then echo information of a partial range is then contained in the shift registers which, up to now, had been recorded, and which is defined by the recording frequency and bit number of the shift register and ends at the moment of switching over.

For the periodic playback of this information, care must be taken that the picture indication of the sounding range appears at the correct height on the screen of the cathode ray tube 54. On playback, moreover, the commencement and end of the shift register are connected together. The commencement of the echo information now to be indicated appears on one of the decoding devices one bit after the switch over. At this moment, the cathode ray beam is not to be found just at the upper end of the picture area. The beam may then be blocked in known fashion and the first indication can be begun with the next following triggering pulse from the synchronizing counter.

In this method of operation, for example, upon the appearance of the base echo, switching over can be effected and interest can be paid then only to the 15m above the sea-bed which corresponds to the net opening of a trawler net. The shift registers then receive at this time only echo information of the last 15m. All previous information has been lost in the mean time at the output of the shift register, since the end of the shift register just recording is switched out by means of the switch b5.

If the information in the vicinity of the seabed — about 15m above and 3m below the sea-bed — is depicted, then the bottom echo is only utilised for operation of the multivibrator 50 and of the relay B in known fashion. In this case, a further amplitude filter 67 (FIG. 1d) is provided, whose threshold value is higher than that of the amplitude filter 13 so that it can only be exceeded by the bottom echo which is considerably stronger than the fish echo.

Figure 1D:
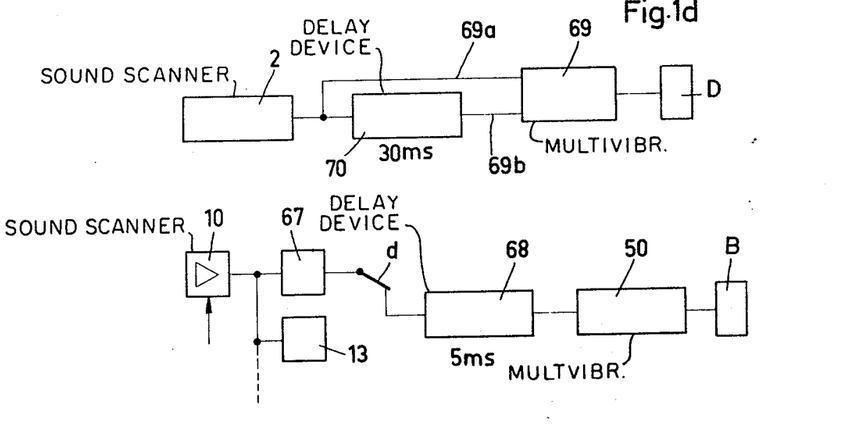

The output of the amplitude filter 67 is connected to a delay device 68 which delays the output signal by 5 ms. This time corresponds to the reciprocation of the sounding sound through a range of about 3m beneath the sea-bed. After the delay time of 15ms, the multivibrator 50 and from this the relay B for the switching over, are operated for a new playback period as described above.

Directly at the time of transmission of a sound pulse, the so-called zero sound appears on the amplifier 10. The zero sound also exceeds the threshold value of the amplitude filter 67. Thus, a pulse must be prevented from reaching the multivibrator 50 via the delay device 68 and switched over prematurely. For this purpose, the connection between the amplitude filter 67 and the delay device 68 must be interrupted by means of a contact $d$. This contact is operated by a relay D which can be switched on and off by means of a bistable multivibrator 69. The multivibrator 69 has two inputs 69$a$ and 69$b$. The input 69$a$ is directly connected to the sounding apparatus 2 and the input 69$b$ is connected to the sounding apparatus through a delay device 70 whose delay time is about 30ms.

Upon the transmission of a sounding pulse, a pulse is fed to the input 69$a$ of the multivibrator 69 from the sounding apparatus and trips this into such a position that the contact $d$ is opened by the relay D. In this way, a zero sounding pulse appearing at the output of the amplitude filter 67 is prevented from being fed to the multivibrator 50. A pulse delayed by the delay device 70 appears at the output 69$b$ of the multivibrator 69 30ms after the pulse sent out by the sounding apparatus. The multivibrator is thereby tripped into its other suitable position and the contact $d$ is closed via the relay D so that when the bottom echo pulse appears, a pulse reaches the multivibrator 50 from the amplitude filter 67 and ensures a switching over to a new playback period.

As above mentioned, all the contacts illustrated in FIG. 1$b$ are switched over by operation of the multivibrator 50. In particular, one of the two echo information stores 30 or 40 is switched over to playback and the other to record and, in the next switching operation, in the reverse direction. These switching operations may be effected in different ways which will now be described with reference to FIG. 1$a$.

A manual switch 71 can be engaged with either one of two contacts, 71$a$ or 71$b$. On engagement with the contact 71$a$, the sounding apparatus 2 is connected to the multivibrator 50 so that each recording of the echo information commences with the transmission of a sounding pulse.

On engagement of the manual switch 71 with the contact 71$b$, the multivibrator 50 is connected to a delay device 75 which delays playback of the pulse from the sounding apparatus, the delay time being freely selectable. Each recording operation thus commences a definite and preferably selectable time after the transmission of the sound pulse. The upper part of the sounding range is thus not indicated but only the zone next adjacent thereto.

The size of the zone taken up in the echo information stores 30 and 40 depends upon the frequency of the pulse generator 56 utilised and the number of stages of this store.

If indications are to be given of the different zones, which are adjustable by means of the switch 71, with different image-forming scales, then other pulse generators operating at other frequencies can be switched in by means of a second and non-illustrated branch of the manual switch 71 instead of the pulse generator 56, 57, (FIG. 1$b$). The output connections of this pulse generator are similarly connected to the branches of the contacts $b$6 and $b$7.

Figure 7:
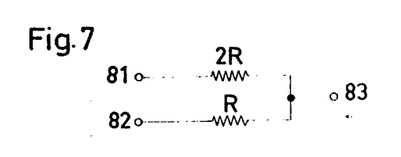
FIGS. 7 and 8 show two embodiments of a decoding device which is connected after the two shift registers, FIGS. 9a and 9b serve to explain operating method III.

The two decoding devices 33 and 43 in FIG. 1$b$ have the function of delivering an amplitude-quantized output pulse to the converter 52, corresponding to the input pulses fed thereto by the two shift registers 31 and 32, or 41 and 42, as the case may be. Both decoding devices are constructed in similar fashion. The input conductors 81 and 82 of the decoding devices are the outputs of the shift registers 31 and 32 or 41 and 42. The decoding devices may take the known form as shown in FIG. 7 as potential dividers, comprising two resistors of values R and 2R, the output of the decoding devices being constituted by the connection point between the two resistors. In this way, it is ensured that the outputs of the shift registers are of lower ohmic value than R and that the input to the converter 52 is at high ohmic value.

Figure 8:
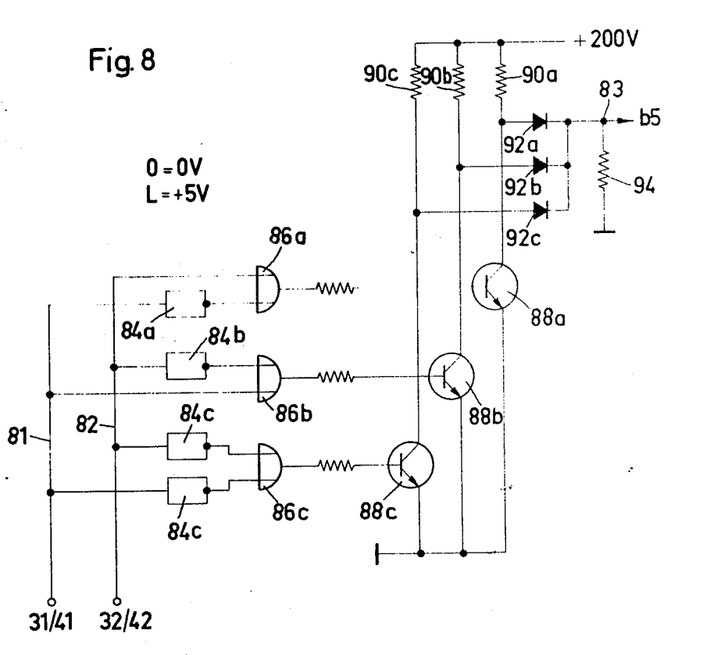

A decoding device which is particularly suitable for playback by means of a writing instrument is illustrated in FIG. 8. This decoding device contains, inter alia, four inverters 84$a$, 84$b$, 84$c$ and 84$c'$, three OR gates 86$a$, 86$b$ and 86$c$, three NPN transistors 88$a$, 88$b$ and 88$c$ and an output resistor 94, a resistor being connected between each OR gate and the bases of the respective transistors, all emitters commonly being at a voltage of 0 volts and all collectors being connected to a voltage of +200 volts via resistors 90$a$, 90$b$ and 90$c$. Each collector is, moreover, connected via a diode 92$a$, 92$b$ and 92$c$, to a common output terminal 83.

The collector resistors 90$a$ and 90$c$ are of such value with respect to the resistor 94, that at the pertinent collectors of the transistors corresponding to the desired amplitude grading, voltages of different values appear when the emitter-collector path of the associated transistors is blocked, whilst the emitter-collector path of the other two transistors conduct.

By means of the OR gates 86$a$ – 86$c$ in connection with the inverters 84$a$ – 84$c'$, it is attained that, corresponding to the information L or O appearing over the conductors 81 and 82, at the bases of two or three transistors, positive pulses appear as shown in the following Table 2, the information 0 illustrating the non-presence of a pulse and the information L illustrating the positive pulse:

TABLE 2

| Inputs | | Bases of the Transistors | | | Output |
|---|---|---|---|---|---|
| 81 | 82 | 88$a$ | 88$b$ | 88$c$ | 96 |
| O | O | L | L | L | O |
| L | O | O | L | L | U$a$ |
| O | L | L | O | L | U$b$ |
| L | L | L | L | O | U$c$ |

If L (a positive pulse) appears on each of the conductors 81 and 82 then a positive pulse will appear at the outputs of the two OR gates 86$a$ and 86$b$, since a positive pulse is fed to one of the inputs. On the other hand, O appears due to the negation in the two inverters 84$c$ and 84$c'$, at both inputs of the OR gate 86$c$ and consequently at its output.

If O (no pulse) appears at both input conductors 81 and 82, L appears at both inputs of the OR gate 86$c$ and thereby also at its output by the inversion. Similarly, L appears at the outputs of the two OR gates 86$a$ and 86$b$ since one of the inputs of this gate is receiving L from the inverter.

If L appears only on the conductor 81 this becomes O in the inverter 84$a$. Thus O appears at the output of the OR gate 86$a$. By inversion, L then appears at the output of the OR gate 86$b$. L also appears at the output of the OR gate 86c since O appears at one of its inputs and L at its other.

A similar arrangement applies for the case when L appears only on the conductor 82. As has already been explained above, the emitter-collector path of the transistors is conductive when a positive pulse, i.e., L, appears at their bases, whilst the emitter-collector path is blocked on the appearance of O. In accordance with Table 2, the following output voltages thus appear at the output 83:

If a pulse does not appear on either of the input conductors 81 and 82, then the bases of all transistors are positive, all emitter-collector paths conduct and the output voltage at 83 is zero. If a positive pulse appears only on the input conductor 81, then positive pulses appear at the bases of the transistors 88b and 88c. Thus, only the transistor 88a is blocked, and an output voltage Ua determined by its collector resistor 90a appears at the output 83. The same applies also for the two other possible input conditions as referred to in Table 2.

If the resistors 90a – 90c have the correct values in relation to that of the resistor 94, then output voltages of the desired amplitude ratios are obtained. For example:

$$Ua : Ub : Uc = 1 : 2 : 3$$

An amplitude ratio of 1: 2 : 3 for the indicating device is not always desired, for example, on operating with writing devices. In this case, the resistor 94 is represented by the resistance of the paper between the writing stylus and the support surface. The strength of the blackness of the writing depends upon the current strength after the penetration of the paper. In order to obtain significantly differentiated blackening grades, the ratio between the current strengths with respect to the stored amplitude, can be increased, for example:

$$Ja : Jb : Jc = 1 : 2 : 4$$

or even greater current ratios can be established by the resistors 90a, 90b, 90c.

In the circuit of FIG. 1b, instead of the cathode ray tube 54, a mechanical writing instrument can be used as is often employed in echo sounding techniques.

The method of operation of the apparatus for the operating method I will now be shortly summarized. In this case, the echo information is stored during a relatively large sounding range and then repeatedly played back during the subsequent sounding range so that a persistent picture appears on the screen.

As aleady described, the sounding apparatus 2 at the beginning of each sounding period sends a triggering pulse to the generator 4, under whose influence the sounding transducer 8 transmits an ultrasonic pulse. The echo pulses appearing within the sounding period thus commenced are taken up by the sounding transducer 8 and fed to the amplifier 10. In dependence upon the strength of the output signal of the amplifier 10, one or more of the amplitude filters 11–13, or none of them, produce an output signal. The coding device 15 (FIG. 6) connected thereto, ensures that pulses are distributed at its outputs 21 and 22 corresponding to the size of its input signals.

Corresponding to the adjustment of the change-over contacts b1 – b4 shown in FIG. 1, the output pulses of the coding device 15 are passed to the inputs of the shift registers 41 and 42. During the whole sounding period, pulses corresponding to the incoming echo pulses are stored one after the other in the two shift registers as shown in FIG. 4. If the pulses are very small, then no shift register receives a pulse, from a predetermined size onwards, only the shift register 41 receives a pulse, in the next amplitude stage only the shift register 42 receives a pulse and in the highest amplitude stage each of them receives a pulse.

At the beginning of the next sounding period, a transmitting pulse is again released from the sounding apparatus 2. Simultaneously, a pulse arrives at the multivibrator 50 via the contact 71a of the manual switch 71, which multivibrator reverses the relay B and with it the contacts b1 – b10 in FIG. 1b. In this way, the shift registers 41 and 42 are closed in ring fashion and the shift registers 31 and 32 are connected to the outputs 21 and 22 of the coding devices 15, so that in the following sounding period storing takes place in the shift registers 31 and 32 and playback or read out takes place in the shift registers 41 and 42 and so on.

Recording and playback (read-in and read-out) are effected at different timing frequencies which is attained by switching from the pulse generator 56 to the pulse generator 57. For purposes of clarity, the playback or read-out will be described for the contact positions shown in FIG. 1. In that case, the shift registers 31 and 32 are closed in ring fashion so that, during the current sounding period, the echo information stored therein is continuously repeated. The pulse generator 57 is connected to the keying inputs of this register, the timing frequency of generator 57 being greater than that of the pulse generator 56, and indeed is so high that the information in each shift register increases many times per second, for example, about 20 times.

During the reversal, continuous echo information is given from the output of the shift registers 31 and 32 to the decoding device 33. They are fed therefrom to the cathode ray tube via the converter 52.

During playback or read-out, the synchronizing pulses circulating in the synchronous counter 35 effects a synchronization of the time base of the cathode ray tube beam as regards playback (read-out) frequency and phase relation (correct picture height).

OPERATING METHOD II:

In operating method II of the echo sounding apparatus, only a section of the sounding range (e.g., one-tenth of the whole sounding range or less) is to be formulated but even this section may be continuously repeated in order to attain a persistent picture. In order to ensure this, the manual switch 71 is engaged on the contact 71b so that the delay member 75 is introduced between the sounding apparatus 2 and the multivibrator 50.

The delay time is adjustable by hand and is, in fact, so adjusted that it embraces the elapsed time between transmission of the sounding pulses and the end of the section of the sounding range that is to be formulated. The recording (read-in) frequency is then so related to the bit number of the echo information store that only echo information concerning the length of the section in question has a place in the information store.

If the pulse leaving the echo sounding apparatus 2 has passed through the delay device 75, there is a switch over between the multivibrator 50 and the relay B, and a new playback (read-out) period is introduced. At this moment, there is available in the echo information store 30 or 40, which has previously effected a storing, only the information of the section of interest. This information is then indicated, as described above, in continuous repetition on the cathode ray tube 54.

At the moment of switching over to a new playback (read-out) period, the light spot of the cathode ray tube 54 will, in general, not be just at the upper end of the picture screen. In order to avoid an indication at a false height, the cathode ray beam is blocked for the time of the first passage of the repeated information. This can be effected via a conductor 95 (FIG. 1c) which leads from a further output of the pulse generator 65 to the cathode ray tube 54.

For all subsequent formulations, the saw-tooth voltage generator 64 receives from the synchronous counter 35a, a pulse each time when just the commencement of the echo information of the section of interest appears at the output 81, 82 (FIG. 1b) of the playback (read-out) echo information store 30 or 40. The light spot is then deflected linearly downwardly. The amplitude of the saw-tooth voltage generator 64 is adjusted in such a manner that the light spot passes over the picture screen within the time over which is necessary for the one-shot playback (read-out) of the store content.

In this method of operation, in many cases read-in and read-out can be effected at the same pulse frequency. Instead of the pulse generator 56 and 57 illustrated in FIG. 1c, only one single pulse generator would then be necessary.

Figure 9A:
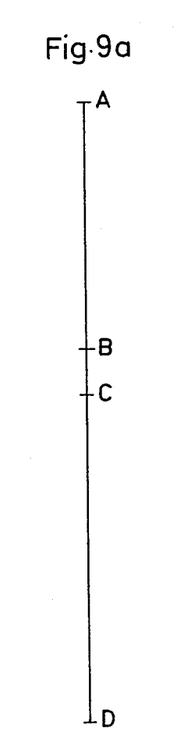

OPERATING METHOD III:

In FIG. 9a the lines A D indicate the total sounding range to be formulated. Of this range, portion B C is to be read-out to a greater scale.

Figure 9B:
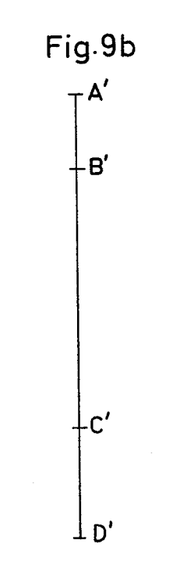

In FIG. 9b A' D' indicates the total picture height. Within this picture height the marking B' C' corresponds to the relatively increased partial range B C formulated.

Figure 10A:
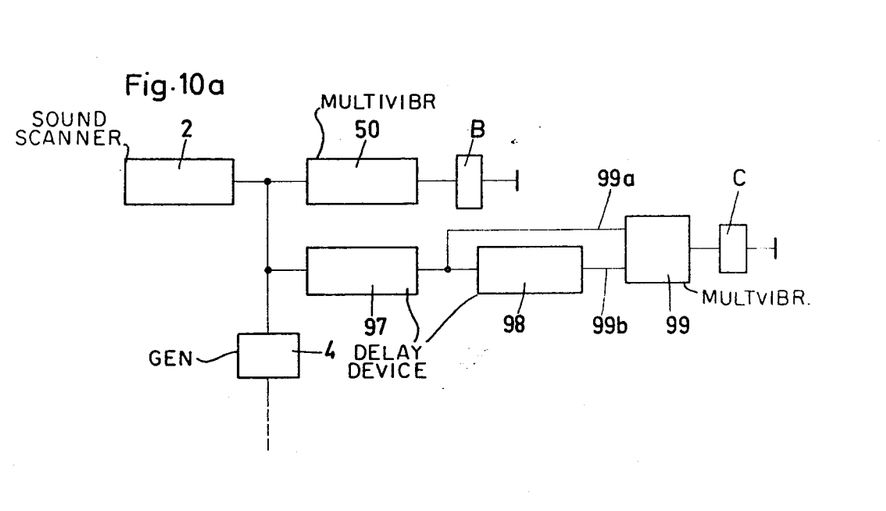
FIGS. 10a and 10b show circuit diagrams for operating method III corresponding to FIGS. 1a and 1b, respectively, but, however, with two recording timing pulse generators.
Figure 10B:
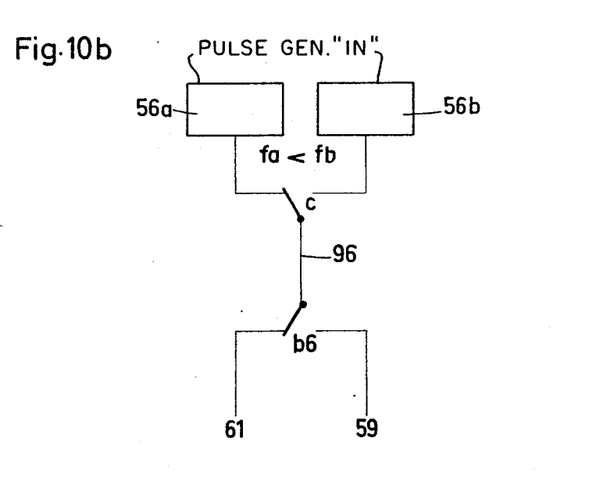

FIGS. 10a and 10b show one part of a circuit suitable for this purpose, in which the circuit elements missing in these Figures correspond to those of FIGS. 1a or 1b, respectively.

Operation can be effected with two different timing frequencies, either on read-in or on read-out. FIG. 10b shows a circuit in which this occurs during read-in. In accordance therewith, two read-in timing pulse generators 56a and 56b are provided instead of the single read-in pulse generator 56 according to FIG. 1b, from which one of them (56a) works at a lower frequency than the other (56b). One or other of these pulse generators can be connected to the contact b6 via a change-over contact c and a conductor 96, which contact, as is shown in FIG. 1b, produces the connection to the conductors 59 and 61, which lead to the timing pulse terminals of the synchronous counter and of the shift register.

According to FIG. 10a as has already been described above, the sounding apparatus 2 is connected to the generator 4 and to the multivibrator 50 which operates the relay B. Moreover, the sounding apparatus is connected to a delay member 97 whose delay time is adjustable and the time corresponds to that which passes whilst the sounding information is taken out of the partial range A B in FIG. 9a. At the output of this delay device there is connected a further delay member 98 whose delay time is similarly adjustable and corresponds to the read-in time of the partial range B to C that is to be expanded. The outputs of both delay devices are connected to inputs 99a and 99b and a bistable multivibrator 99. The output of this multivibrator is connected to earth via a relay coil C.

The relay C operates the change-over contact c in FIG. 10b and serves for switching over from read-in timing pulse generator 56a to the read-in timing generator 56b operating at a higher frequency.

On transmission of a sounding pulse a new read-in and read-out period is introduced via the multivibrator 50 and the relay B in the above described manner. The range A B in FIG. 9a is then stored from the shift registers switched to read-in. At this time, the contact c is in its position shown in FIG. 10b so that operation can then be carried out at the lower frequency.

After the expiry of a time set up by the delay device 97, which corresponds to the range A, B, a pulse appears at the end of this delay device which is taken to the input 99a of the multivibrator 99. The multivibrator is tripped and the contact c is changed over via the relay C. From this point on the higher read-in frequency of the pulse generator 56b is read-in. The read-in shift registers thus now receive more bit information per unit of time.

Simultaneously with the input of a pulse at the input 99a of the multivibrator 99, a pulse is also fed into the delay member 98. After expiry of the delay time of this device, which corresponds to the range B C to be expanded, a pulse appears at the output of this delay device and consequently at the input 99b of the multivibrator, which trips the multivibrator back whereby the contact c is changed over again via the relay C to the read-in timing pulse generator 56a operating at the lower frequency. The echo information of the remaining range C D is stored at this read-in frequency.

Read-out is at constant frequency in the manner already described above, whereby the range B C is read-out in expanded form, since it contains more information bits per unit of time than the remaining ranges.

Operating Method IV:

In this method of operation, with a very small sounding distance of only a few metres, read-out should be effected by means of a mechanical writing instrument, the writing time of this instrument being substantially longer than one sounding period. The read-out time must, therefore, be expanded vis-a-vis the read-in time.

Figure 11:
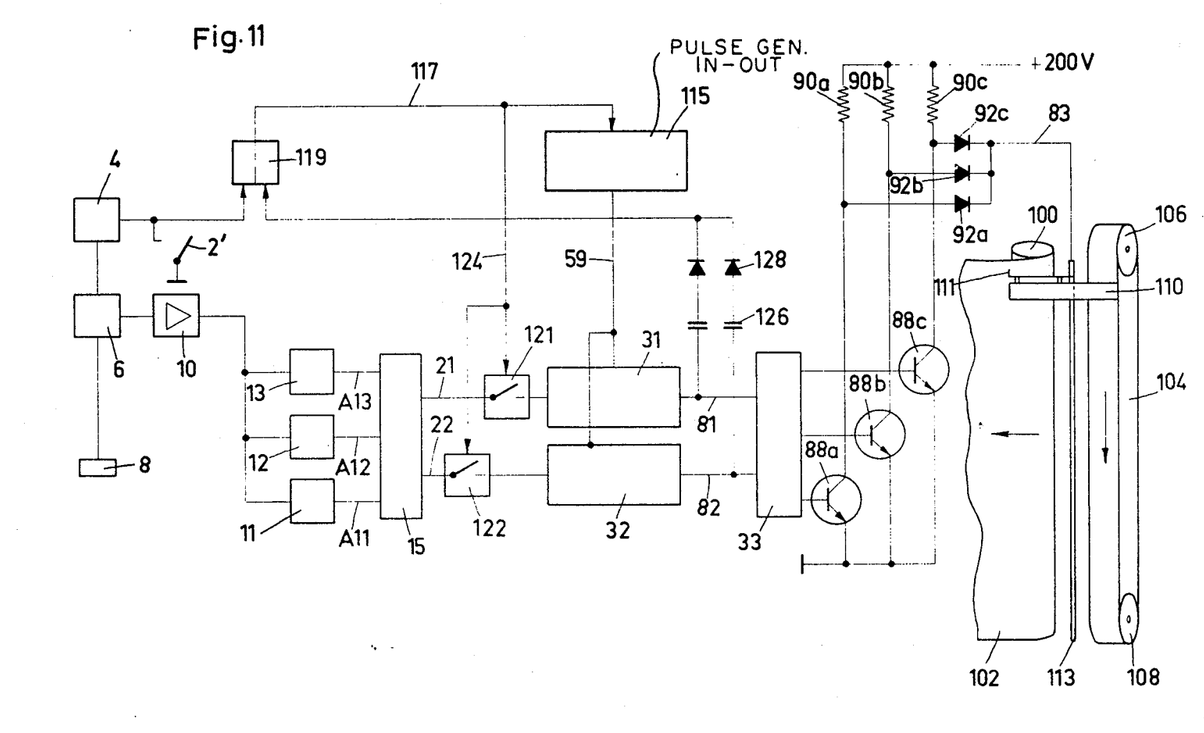
FIG. 11 shows a circuit diagram of a planar sounding device wih a writing instrument (operating method IV).

FIG. 11 shows, at the right, a mechanical writing instrument with which a web of electrically writable paper 102 is drawn towards the left from a roll 100. A continuous belt 104 is laid around two rollers 106 and 108 and is driven at a constant speed. A traverse 110 is secured to the belt which carries a writing stylus 111. The paper is taken upon another roll which is not illustrated and, indeed, at such a speed that an advance of about 0.3 to 1mm is produced per cycle of the stylus.

Within the writing range, i.e., during the time that the stylus is located at the front side of the belt, the right end of the needle shown in FIG. 11 slips on a conducting disc 113 by means of which current is conveyed to the stylus from the output 83 of the decoding device. Beneath the paper there is located a metal plate, not illustrated, which is connected to earth. The current passes through the paper and thereby blackens it more or less in dependence upon the amount of voltage present between the stylus and the metal plate.

The left part of the circuit according to FIG. 11 with the parts 4 to 22 is set up similarly to the circuit according to FIG. 1a. In the present case, a cam contact 2' serves as a sounding apparatus which is operated by a cam disc which is driven from the shaft of the roller 106 of the writing instrument via gearing which is not illustrated.

Only one store is provided which, for example, consists of two shift registers 31, 32 parallel each to the other. During read-in and read-out the shift registers are operated at different pulse frequencies. For this purpose, two different pulse generators may be provided. In the circuit according to FIG. 11, for example, only one pulse generator 115, whose frequency of operation can be changed over, is provided, and whose output is connected to the timing pulse terminals of the shift registers 31 and 32 via a conductor 59. For read-in a higher pulse frequency is provided than for read-out. The timing pulse generator 115 is connected to the output of a bistable multivibrator 119 via a conductor 117. On each tripping of the multivibrator, the pulse generator is switched from one to the other frequency.

Two gates 121 and 122 are connected between the coding device 15 and the inputs of the shift registers 31 and 32, which gates are connected also to the output of the multivibrator 119 via a conductor 124. On switching over the pulse generator 115 to the higher frequency both gates are opened and vice versa.

A differentiating circuit is connected to each of the outputs 81, 82 of the two shift registers, said circuit comprising a capacitor 126 and a diode rectifier 128. The rectifiers are connected in common to one of the inputs of the multivibrator 119, the other input thereof being connected to the sounding contact 2'.

The construction of the decoding device corresponds to that shown in FIG. 8, the resistor 94 there provided, however, being replaced by the resistance of the writing paper 102 lying between the out-put 83 and earth.

The arrangement operates as follows:

When the contact 2' is operated by the circulating cam, the bistable multivibrator 119 is tripped at the same time as the release of the transmission pulse, and in such a fashion that the gates 121 and 122 are opened (i.e., the illustrated contacts are closed) and the pulse generator 115 is switched over to the higher frequency. Sounding information then passes through the gates into the empty shift registers 31 and 32. As soon as the first pulse of this information appears at at least one of the outputs 81 and 82 of the shift registers, the multivibrator 119 is tripped via at least one of the differentiating circuits 126 and 128. The gates 121 and 122 are blocked (contacts open) by its output signal and the pulse generator 115 is switched over to the lower frequency. With this timing frequency, voltages which correspond to the stored information, pass via outputs 81, 82 of the shift register to the decoding device 33 and interrupt the collector current of one of the transistors 88a – 88c according to the amount of the stored amplitude so that current flows via the disc 113 to the stylus 111 via one of the resistors 90a – 90c and its associated rectifiers 92a – 92c. The current flows through the paper 102 to earth and blackens the paper in dependence upon its strength.

The drive for the stylus 111 and for the cam disc operating the contact 2' must be so adjusted that the stylus appears at the upper edge of the paper at that moment at which the bistable multivibrator is switched over to the lower frequency. This is the case when the commencement of the echo information is arriving just at the end of the shift register. The contact 2' must be operated earlier by this time (compared with the commencement of writing). The bit number of the shift register and the read-in pulse frequency are so mutually adjusted that the shift register can receive the echo information of the largest sounding depths coming into question.

The lower frequency of the timing pulse generator 115 is so adjusted to the writing speed, that the shift registers are empty when the stylus 111 has reached the lower end of the paper or the writing range. Until a new operation of the contact 2', the gates 121 and 122 remain closed and the shift register empty. By this means a special erasure device for the shift register can be dispensed with.

Instead of the arrangement illustrated in FIG. 1, the switching over from read-in to read-out can be effected by means of two contacts which are distributed along the path of the belt and operated by a cam circulating with the belt.

Since the time in which the stylus is located on the paper is less than half the circulation time of the belt 113, several styli may be arranged in known fashion on the belt which cooperate with several contacts connected in parallel corresponding to the contact 2'.

I claim:

1. In echo-sounding apparatus having at least one digital intermediate store and an indicating apparatus, echo signals appearing within one echo sounding period, which form the echo information, being read into the intermediate store and subsequently read out of the store and fed to the indicating apparatus, at least one timing pulse generator operable at a selectable frequency operatively coordinated with said intermediate store, means for operating said intermediate store on storage of the echo information, at a pulse frequency different from the read-out pulse frequency wherein on read-out of the echo information a higher pulse frequency is used than on read-in, and wherein the store is read-out repeatedly, said indicating apparatus comprising a two-beam cathode ray tube, the first beam of which is influenceable by the echo information appearing in real time and the second beam of which is influenceable by the echo information of the preceding sounding period read-out repeatedly from the store at a higher pulse frequency than that used at read-in, and wherein means are provided for deflection of the two electron beams of said cathode ray tube at speeds along the time axis that have the same relationship to one another as the read-in and read-out frequencies of said store.

2. In echo-sounding apparatus having at least one digital intermediate store and an indicating apparatus, echo signals appearing within one echo sounding period, which form the echo information, being read into the intermediate store and subsequently read out of the store and fed to the indicating apparatus, at least one timing pulse generator operable at a selectable frequency operatively coordinated with said intermediate store, means for operating said intermediate store on storage of the echo information, at a pulse frequency different from the read-out pulse frequency, said store comprising at least one shift register whose output is open on read-in and connected to its input on read-out, and wherein at least one of said timing pulse generators is connected to a timing input of said shift register.

3. Echo-sounding apparatus according to claim 2, wherein:
   a. said store consists of two shift registers of which at any time, one is effecting read-in and the other is effecting read-out;
   b. a synchronous counter having the same bit number as said shift registers is associated with said shift registers;
   c. means are provided to switch said synchronous counter, in common with said shift registers from read-in to read-out and vice versa;
   d. a cathode ray tube serving as said indicating apparatus;
   e. the zero position input of said synchronous counter is connectable to a timing pulse generator and its output is connectable to a saw-tooth voltage generator constituting the time base of said cathode ray tube;
   f. said timing pulse generator is connectable in common to an input of said synchronous counters and said associated shift registers whereby, simultaneously with the switching over of one of said shift registers, a zero position pulse is fed into said associated synchronous counter; and
   g. the counting pulse is operative to trigger said sawtooth voltage generator at each commencement of read-out of the echo information contained in said shift register.

4. Echo-sounding apparatus according to claim 3 wherein said synchronous counter includes two shift registers, which are restored to zero and carry the circulating counting pulse for triggering the sawtooth voltage generator alternately according to the switching over of the stores from one condition to the other.

5. In echo-sounding apparatus having at least one digital intermediate store and an indicating apparatus, echo signals appearing within one echo sounding period, which form the echo information, being read into the intermediate store and subsequently read out of the store and fed to the indicating apparatus, at least one timing pulse generator operable at a selectable frequency operatively coordinated with said intermediate store, means for operating said intermediate store on storage of the echo information, at a pulse frequency different from the read-out pulse frequency, said store comprising at least one shift register, and wherein at least one of said timing pulse generator is connected to a timing input of said shift register.

6. Echo-sounding apparatus according to claim 5 wherein the output of said shift register is open on read-in.

* * * * *